United States Patent
Sugawara

(10) Patent No.: US 6,563,279 B2
(45) Date of Patent: May 13, 2003

(54) POWER WINDOW SYSTEM WITH CONTROL UNIT FOR DETECTING FOREIGN OBJECT CAUGHT IN CAR WINDOW

(75) Inventor: Takehito Sugawara, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 9 days.

(21) Appl. No.: 09/919,057

(22) Filed: Jul. 31, 2001

(65) Prior Publication Data

US 2002/0030459 A1 Mar. 14, 2002

(30) Foreign Application Priority Data

Aug. 2, 2000 (JP) ........................................ 2000-238875

(51) Int. Cl.[7] ................................................. H02P 5/00
(52) U.S. Cl. ........................ 318/443; 318/266; 318/282; 318/466
(58) Field of Search ................................ 318/266, 466, 318/282, 443

(56) References Cited

U.S. PATENT DOCUMENTS 5,497,326 A * 3/1996 Berland et al. .............. 318/468
5,689,160 A * 11/1997 Shigematsu et al. ........ 318/281
6,034,495 A * 3/2000 Tamagawa et al. ......... 318/266
6,034,497 A * 3/2000 Tamagawa et al. ......... 318/266
6,297,609 B1 * 10/2001 Takahashi et al. .......... 318/283

* cited by examiner

Primary Examiner—Rita Leykin
(74) Attorney, Agent, or Firm—Brinks Hofer Gilson & Lione

(57) ABSTRACT

The present invention provides a power window system, by which it is possible to reliably detect that a foreign object is caught in a car window even during the period from the time of starting of a motor to the time when stable operation of the window is reached, and also, it is possible to minimize erroneous detection. The power window system of the present invention includes a pulse generator for generating repeated pulses in response to rotation of a motor, and a control unit for judging that a foreign object is caught in the window. The control unit divides the period of operation into three periods to match the characteristics during the starting of the power window system, i.e. a first period from the starting of the motor to the initiation of upward or downward movement of the window, a second period to the time point when the window reaches and maintains stable operation, and a third period after the second period. In the first and the second periods, one cycle immediately before the repeated pulses is compared with the next half cycle. In the third period, a half cycle immediately before is compared with the next half cycle to judge whether a foreign object is caught in the window or not.

3 Claims, 4 Drawing Sheets

FIG. 3

PROCEDURE FOR JUDGING WHETHER SOMETHING IS CAUGHT IN THE WINDOW OR NOT:

- IN THE CASE OF THE FIRST PERIOD (T1)

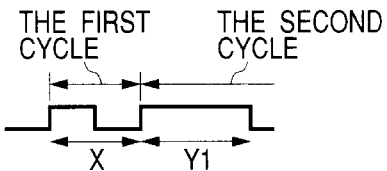

SOMETHING IS CAUGHT IN THE WINDOW IF Y1 IS LONGER THAN A GIVEN MULTIPLE OF X.

OR

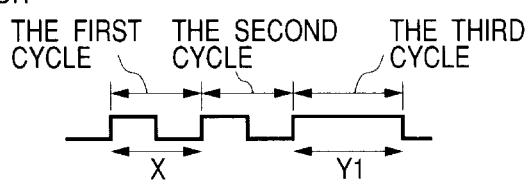

- IN THE CASE OF THE SECOND PERIOD (T2)

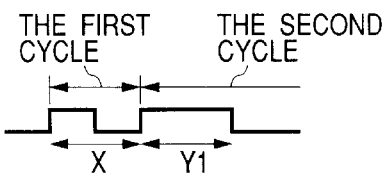

SOMETHING IS CAUGHT IN THE WINDOW IF Y1 IS LONGER THAN X.

OR

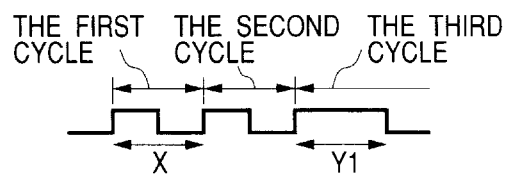

- IN THE CASE OF THE THIRD PERIOD (T3)

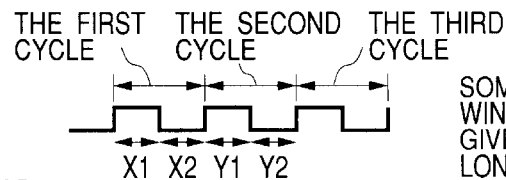

SOMETHING IS CAUGHT IN THE WINDOW IF Y1 IS LONGER THAN A GIVEN MULTIPLE OF X1, AND Y2 IS LONGER THAN A GIVEN MULTIPLE OF X2.

OR

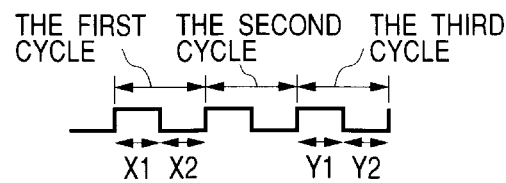

POWER WINDOW SYSTEM WITH CONTROL UNIT FOR DETECTING FOREIGN OBJECT CAUGHT IN CAR WINDOW

BACKGROUND OF THE INVENTION

1. Field of the Invention

The present invention relates to a power window system for an automobile, and in particular, to a power window system with a control unit for detecting a foreign object caught in a car window for the purpose of stopping or reversely operating to open or close the window when the foreign object is caught in the car window.

2. Description of the Prior Art

A power window system for opening and closing windows by a driving unit (motor) is used on an automobile. A power window system is proposed in which, when a foreign object is caught in a car window during opening or closing operation of the window, it is judged whether a foreign object is caught in the window, and if something is caught in the window, the motor is immediately stopped or reversely operated for the purpose of avoiding overload on the motor and of protecting what is caught in the window.

A conventional type power window system as described above comprises, as shown in FIG. 4, a driving unit 41 (hereinafter referred as "motor") rotatable in normal and reverse directions to open or close the window, a power feeding unit 42 for supplying power to the motor 41, an operation switch unit 43 having a plurality of switches and for outputting voltage serving as a signal for opening or closing the window by manual operation, a control unit 44 (hereinafter referred as "CPU") for controlling rotation of the motor 41 via the power feeding unit 42 in response to operation of the operation switch unit 43, and a pulse generator 45 for generating repeated pulses accurately in response to the rotation of the motor 41.

When one of switches (43a, 43b, 43c and 43d) on the operation switch unit 43 is operated, a signal corresponding to the operated switch is inputted to one of input terminals (P02, P03 or P04) of the CPU 44. In response to the inputted signal, the CPU 44 outputs a signal from output terminals (P05 or P06) to the power feeding unit 42. The power feeding unit 42 supplies power to the motor 41 in response to the inputted signal. As a result, the motor 41 is rotated in a normal or reverse direction, and the window is opened or closed.

In the arrangement as described above, when the motor 41 is rotated, the pulse generator 45 is operated in response to the rotation of the motor 41, and one-phase pulses, being reversed at each half turn, are generated, and the pulses are outputted to the input terminal P07 of the CPU 44. In this case, the CPU 44 finds out interval of rising/falling of the inputted pulses from the count of an internal clock signal. The count value thus obtained is converted to a motor torque value, and this is compared with a value already set in an internal memory. If the motor torque value is greater than the preset value, it is judged that a foreign object is caught in the window, and the motor 41 is stopped or reversely operated.

Also, an alternative method has been used. In this method, the interval of generation of the inputted pulses is converted to moving speed of the window, and when the moving speed is decreased, it is judged that a foreign object is caught in the window. That is, when the amplitude of a pulse becomes longer, it is judged that a foreign object is caught in the window, and the motor 41 is stopped or reversely operated.

However, when the power window system is started, operation of the motor 41 is not stable until a certain time period elapses. In association with instable operation, sudden changes may occur in a motor torque or in a current value, and it is not possible to detect in stable manner that a foreign object is caught in the window. In this respect, in the conventional type power window system, no detection of a foreign object is achievable for a certain period after the starting of the motor 41, e.g. from the time of starting of the motor 41 up to the time of generation of 40 pulses, and the foreign object caught in the window is detected thereafter. In this respect, even when a foreign object is caught in the window during the above period, it is not possible to detect the trouble. According to another method, it is judged that a foreign object is caught in the window when an interval of pulse generation is 700 ms or more, for instance. Thus, some time is required from the time when a foreign object is caught in the window to the time of judgment. As a result, the foreign object is continuously caught in the window without being removed during this period.

SUMMARY OF THE INVENTION

To solve the above problem, it is an object of the present invention to provide a power window system, by which it is possible to reliably detect in a short time that a foreign object is caught in the window even during the period from the starting of the motor to the moment when the motor reaches stable operation.

To attain the above object, the power window system according to the present invention comprises a driving unit rotatable in normal and reverse directions to open or close a car window, a pulse generator for generating repeated pulses in response to the operation of the driving unit, and a control unit for judging that a foreign object is caught in the window based on the repeated pulses and for stopping or reversely operating the driving unit, wherein in a first period (i.e. from the starting of the driving unit to a first time point when the window starts upward movement), the control unit judges and detects that a foreign object is caught in the window when time duration in which pulses are generated in one of a second cycle or a third cycle is longer than a given multiple of time duration required for the repeated pulses in a first cycle immediately before.

Also, the present invention provides the power window system as described above, wherein, in a second period (i.e. from the first time point to a second time point when the window reaches and maintains operation at a constant speed), the control unit judges and detects that a foreign object is caught in the window when time duration in which pulses are generated in one of the second cycle and the third cycle is longer than time duration required for the first cycle.

Further, the present invention provides the power window system as described above, wherein, in a third period after the second time point, the control unit judges and detects that a foreign object is caught in the window when time duration in which pulses are generated in the second cycle is longer than a given multiple of time duration in which the pulses are generated in the first cycle, and also when time duration in which pulses are not generated in the second cycle is longer than a given multiple of time duration in which pulses are not generated in the first cycle.

BRIEF DESCRIPTION OF THE DRAWINGS

FIG. 3 represents drawings to explain a procedure for judging that a foreign object is caught in a car window in the power window system of the present invention in a first period, a second period, and a third period.

DETAILED DESCRIPTION OF THE PREFERRED EMBODIMENT

A description will be given below on an embodiment of a power window system of the present invention referring to FIG. 1 to FIG. 3.

Figure 1:
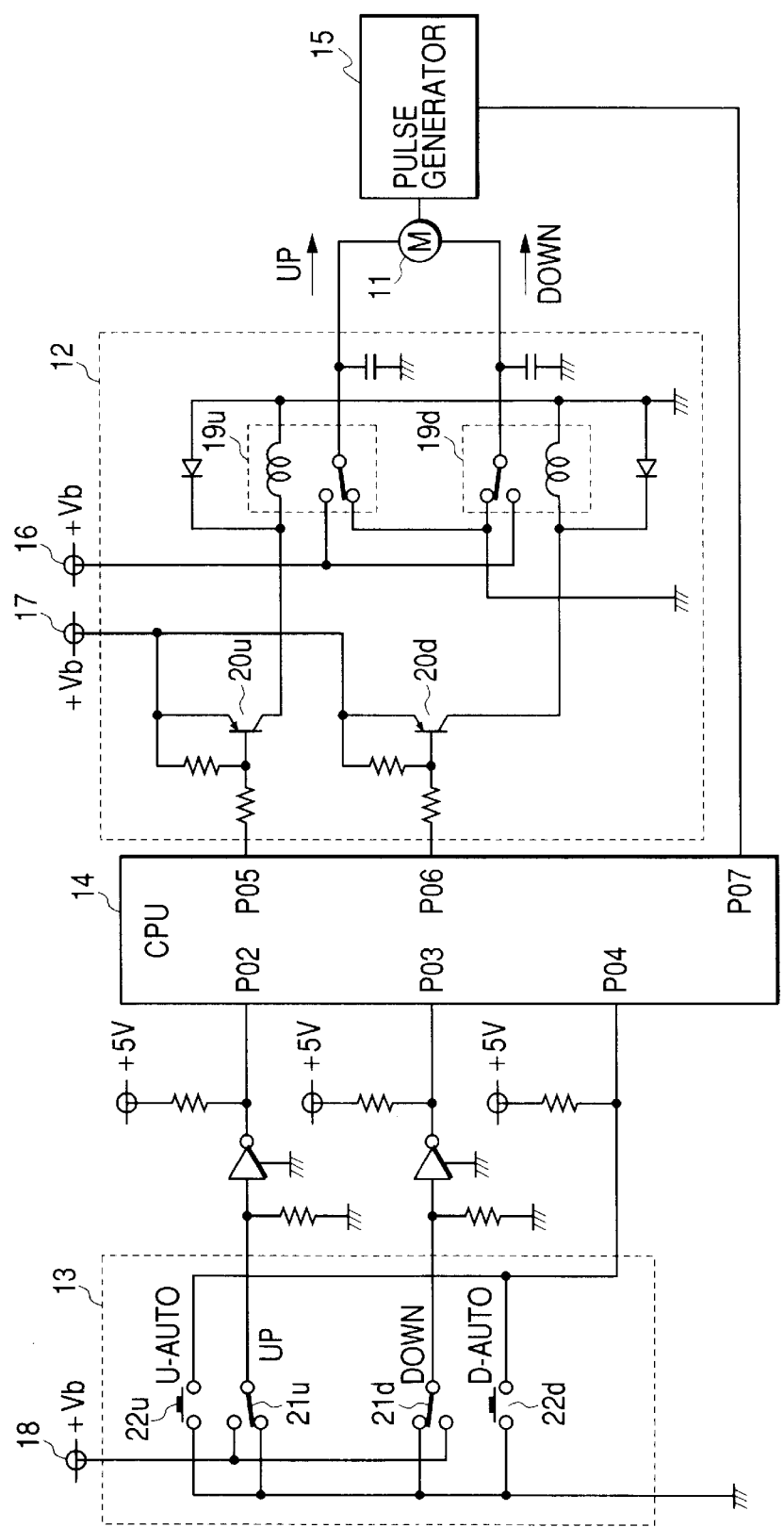
FIG. 1 is a diagram showing an arrangement of an embodiment of a power window system according to the present invention.

FIG. 1 is a diagram of an arrangement of an embodiment of the power window system of the present invention. The power window system of the present invention comprises a driving unit 11 (hereinafter referred as "motor"), a power feeding unit 12 to supply power to the motor, operation switch unit 13, a control unit 14 (hereinafter referred as "CPU"), a pulse generator 15, and on-board power terminals 16, 17 and 18.

The motor 11 is a motor rotatable in normal and reverse directions for opening/closing car window. In a circuit shown in FIG. 1, when electric current flows downward from above (UP), it is rotated to close the window. When electric current flows upward from below (DOWN), it is rotated to open the window.

The power feeding unit 12 is a circuit to supply power from the on-board power terminal 16 to the motor 11, and it comprises relays 19u and 19d and switch transistors 20u and 20d. The moving contacts of the relays 19u and 19d are connected to different terminals of the motor 11 respectively, and one of fixed contacts is connected to the on-board power terminal 16, and the other of the fixed contacts is connected to the ground. Each of the moving contacts is usually connected to the fixed contact on the ground side. These are connected to the fixed contacts on the on-board power terminal 16 when control current is flowing to coils of the relays 19u and 19d.

The transistor 20u has its base connected to an output terminal P05 of the CPU 14. Its collector is grounded via the coil of the relay 19u. Its emitter is connected to the on-board power terminal 17. The transistor 20d has its base connected to the output terminal P06 of the CPU 14. Its collector is grounded via the coil of the relay 19d, and its emitter is connected to the on-board power terminal 17.

The operation switch unit 13 comprises a manual window closing switch (UP) 21u, a manual window opening switch (DOWN) 21d, an auto window closing switch (U-AUTO) 22u, and an auto window opening switch (D-AUTO) 22d.

A moving contact of the manual window closing switch 21u is connected to an input terminal P02 of the CPU 14 via an inverter. One of fixed contacts is connected to the on-board power terminal 18, and the other of the fixed contacts is connected to the ground. A moving contact of the manual window opening switch 21d is connected to an input terminal P03 of the CPU 14 via a different inverter. One of the fixed contacts is connected to the on-board power terminal 18, and the other of the fixed contacts is connected to the ground.

Further, each of the auto window closing switch 22u and the auto window opening switch 22d has its one end grounded, and the other end is connected to an input terminal P04 of the CPU 14.

The CPU 14 has a plurality of terminals for input and output purposes. On the input terminals (P02, P03, and P04), voltage is applied to serve as a signal from the operation switch unit 13. A voltage serving as a signal to turn each transistor on or off is outputted to the output terminals (P05 and P06) for the bases of the transistors 20u and 20d. Also, the input terminal P07 is connected to the pulse generator 15, and repeated pulses generated by the pulse generator 15 are inputted. By the repeated pulses, it is judged whether a foreign object is caught in the window or not, and if a foreign object is caught in the window, the motor 11 is stopped or reversely operated.

The pulse generator 15 is designed, for instance, to utilize threads on a gear mounted on the rotation shaft of the motor 11 or it is designed to detect reversal of a magnetic field based on the rotation of the motor 11 using a hole IC and a magnet for a sensor. It is interlocked with and designed to respond to the rotation of the motor 11 and generates the repeated pulses with high and low values changed at each half-turn, and the pulses are outputted to the CPU 14.

Each of the on-board power terminals 16, 17 and 18 is connected to a positive electrode (+Vb) of an on-board power source, and the power is supplied to each unit.

With the arrangement as described above, when the manual window closing switch 21u is operated and the moving contact is turned toward the on-board power terminal 18, voltage from the on-board power terminal 18 is turned to a signal, and it is inputted to the input terminal P02 of the CPU 14 via the manual window closing switch 21u and the inverter. Next, the CPU 14 outputs a signal for turning the transistor 20u from the output terminal P05. Then, the transistor 20u is turned on, and electric current from the on-board power terminal 17 is supplied to the coil of the relay 19u via emitter and collector. The moving contact of the relay 19u is switched over to the onboard power terminal 16, and voltage from the on-board power terminal 16 is applied on the motor 11 to close the window, and the window is closed.

Here, when the auto window closing switch 22u is operated, the ground voltage is turned to a signal, and it is inputted to the input terminal P04 of the CPU 14. In this case, even when operation of the manual window closing switch 21u is stopped, the CPU 14 continues to output the signal to turn the transistor 20u on from the output terminal P05, and the window is continuously closed.

If operation of the manual window closing switch 21u is stopped without operating the auto window closing switch 22u, the moving contact is separated from the on-board power terminal 18, and the ground voltage is inputted to the input terminal P02 of the CPU 14 via the inverter. Next, the CPU 14 outputs a signal for turning the transistor 20u off to the output terminal P05. Then, the transistor 20u is turned off, and a control current ceases to flow to the coil of the relay 19u. The moving contact of the relay 19u is switched over to the ground side, and voltage is not applied on the motor 11 any longer. Then, the rotation of the motor 11 is stopped, and the window is stopped.

Similarly, when the manual window opening switch 21d is operated and the moving contact is turned toward the on-board power terminal 18, voltage from the on-board power terminal 18 is turned to a signal, and it is inputted to the input terminal P03 of the CPU 14 via the manual window opening switch 21d and the inverter. Next, the CPU 14 outputs a signal for turning the transistor 20d on from the output terminal P06. Then, the transistor 20d is turned on. An electric current from the on-board power terminal 17 is supplied to the coil of the relay 19d via the emitter and collector. The moving contact of the relay 19d is switched over to the on-board power terminal 16. Voltage from the on-board power terminal 16 is applied on the motor 11 to open the window, and the window is opened.

Here, when the auto window opening switch 22d is operated, the ground voltage is turned to a signal, and it is inputted to the input terminal P04 of the CPU 14. In this case, even when operation of the manual window opening switch 21d is stopped, the CPU 14 continues to output the signal for turning the transistor 20d on from the output terminal P06, and the window is continuously opened.

If operation of the manual window opening switch 21d is stopped without operating the auto window opening switch 22d, the moving contact is separated from the on-board power terminal 18. The ground voltage is inputted to the input terminal P03 of the CPU 14 via the inverter. Next, the CPU 14 outputs a signal for turning the transistor 20d off to the output terminal P06. The transistor 20d is turned off, and a control current is not supplied to the coil of the relay 19d any longer. The moving contact of the relay 19d is switched over to the ground side. Voltage is not applied on the motor 11 any longer. The rotation of the motor 11 is stopped, and the window is stopped.

By the arrangement and the operation as described above, the signals are outputted to the CPU 14 in response to the operation of the switches of the operation switch unit 13. The CPU 14 controls the rotation of the motor 11 via the power feeding unit 12. As the motor 11 is rotated in normal/reverse directions, the window of the car is opened/closed. Interlocked with the rotation of the motor 11, the pulse generator 15 generates the repeated pulses, and the repeated pulses are inputted to the input terminal P07 of the CPU 14.

Figure 2:
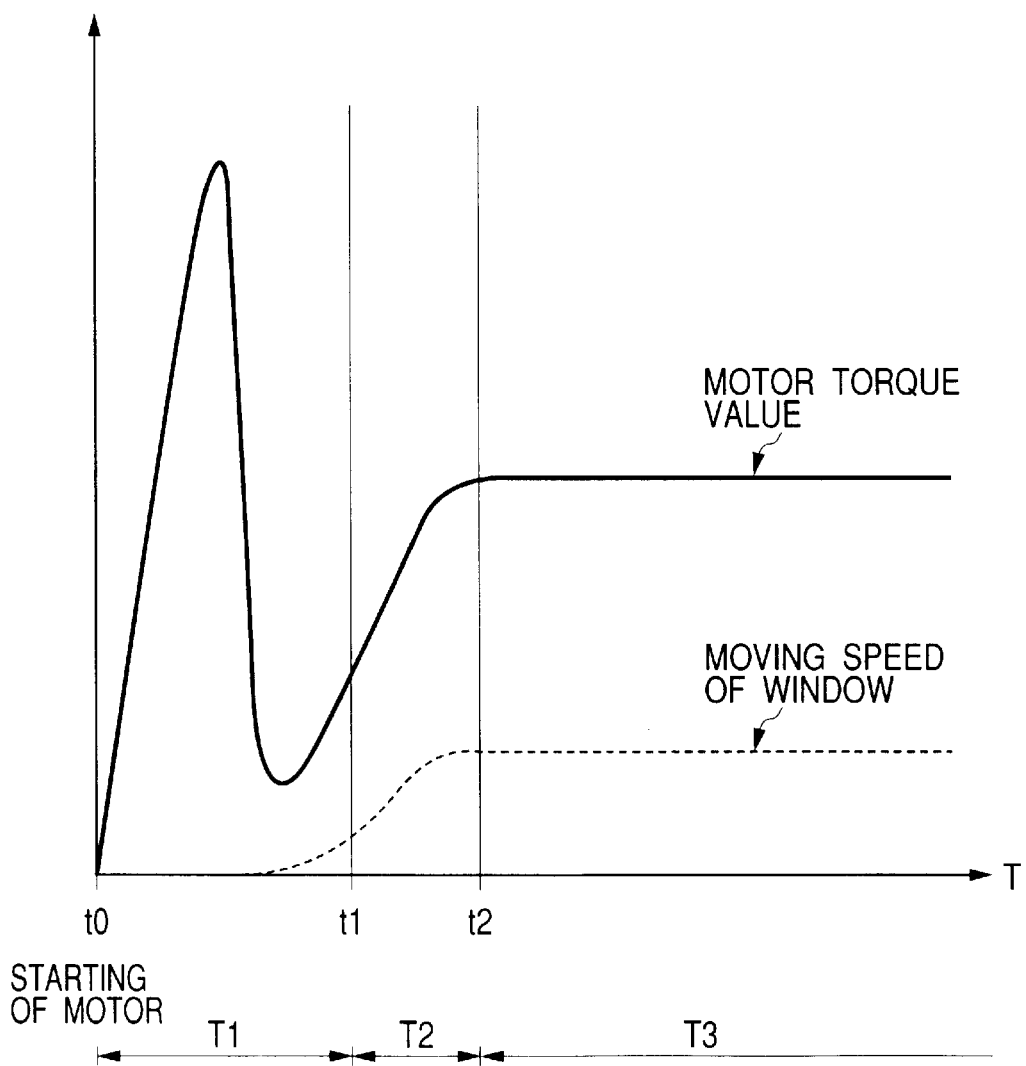
FIG. 2 is a diagram showing characteristics of the power window system of the present invention when a motor is started.
Figure 4:
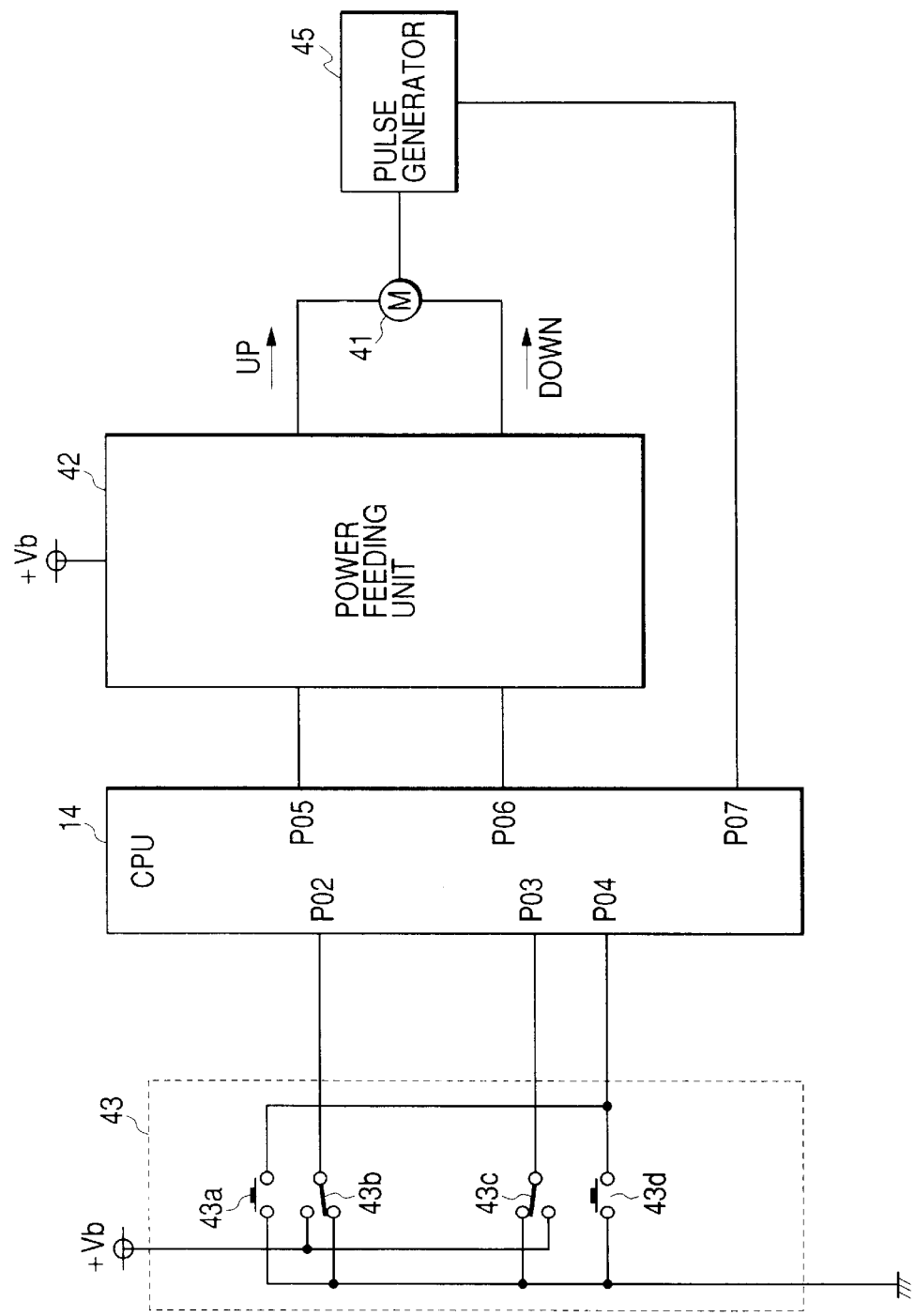
FIG. 4 is a block diagram of an arrangement of a conventional type power window system.

Next, FIG. 2 is a diagram showing the moving speed of window and the characteristics of motor torque value when the power window system is started. In FIG. 2, dotted line indicates the changes over time of the moving speed of the window from the time of starting of the motor 11.

The power window system moves the window up or down by transmitting the rotation of the motor 11 to the window. As a mechanism to move the window up or down, there are two types: a wire type mechanism designed to connect the motor 11 with the window by a wire, and a gear type mechanism to connect the motor 11 with the window by a gear. The characteristics are different according to each type. For instance, from the time of starting of the motor 11 to the starting of upward or downward movement of the window, some time is required to take up or absorb slack of the wire in case of the wire type mechanism. In the case of the gear type mechanism, some time is required to take up or absorb idling until the gear engages. The duration of the time is different according to each type.

The time period from the time point or moment (t0) of starting of the motor 11 to the time point (t1) of the starting of upward or downward movement of the window is defined as a first period (T1). In this case, the time point (t1) is set as given below, for instance. In the case of the wire type mechanism, there is slack of a wire, and the time point (t1) is obtained from the maximum designed amount of the wire slack. For instance, it is assumed that the maximum amount of the wire slack is 15 mm and the rotating amount of the motor 11 per pulse is 0.875 mm. In this case, if 17 pulses are detected after the starting of the motor 11, it means that the slack of the wire has been taken up or absorbed. The time of the detection of these 17 pulses is set as the time point (t1).

The above explanation has been given by taking the wire type mechanism as an example. In the case of the gear type mechanism, the time may be set by replacing the wire slack with the idling up to the moment when the gear is engaged.

The time period from the first period (T1) to the time point (t2) when the window is operated at constant speed is defined as a second period (T2). In this case, it is assumed that the time point (t2) is the moment when the maximum time has been reached among time durations obtained in the experiment performed in advance.

Torque value outputted by the motor 11 is shown by solid line in FIG. 2. The torque of the motor 11 is low in the first period (T1) and it is higher in the second period (T2) than in the first period (T1) if the period to absorb idling and the like immediately after starting is exempted. Then, it is further higher in the third period (T3) than in the second period (T2).

In this power window system, the first period (T1) is defined as the time duration from the starting of the motor 11 to the time of generation of the 17th pulse. The second period (T2) is defined as time duration from generation of the 18th pulse to the generation of the 21st pulse, and the third period (T3) is the time period after the generation of the 22nd pulse.

Next, FIG. 3 represents drawings to explain a procedure to judge that a foreign object is caught in the window in each of the periods.

As shown in FIG. 3, in the first period, the time duration (X) required for a first cycle immediately before is compared with time duration (Y1) in which the pulses are outputted in one of a second cycle or a third cycle. If the latter (Y1) is longer than a given multiple (e.g. twice) of the former (X), it is judged that a foreign object is caught in the window. According to this judging procedure, in the first period there is a time period enough to absorb the idling and the like and enough to start upward or downward movement of the window. Even when a foreign object is not caught in the window, the rotation of the motor 11 varies extensively. In this sense, erroneous judgment based on the changes in the motor rotation, i.e. an erroneous judgment that a foreign object is caught in the window, is excluded.

If it is judged that no foreign object is caught in the window, performance characteristics of the control unit 14 are taken into account. The next judgment is deviated by one cycle each, i.e. the second cycle of the repeated pulses is regarded as the first cycle, and the third cycle is regarded as the second cycle, and comparison is made. Or, it is deviated by half cycle, i.e. time duration in which the pulses are not outputted in the first cycle is compared with time duration in which pulses is not outputted in the second cycle (or the third cycle), and judgment is made sequentially.

The multiplying factor used for the comparison varies according to the difference of the mechanism to move the window up or down such as wire type or gear type, and it may be three times instead of twice.

In the case of the time point (t0) immediately after the starting, if the first pulse is not generated for a duration of 700 ms, it is judged that a foreign object is caught in the window.

Next, in the second period, the time duration (X) required for the first cycle is compared with the time duration (Y1) in which pulses are outputted in one of the cycles as in the first period. If the latter (Y1) is longer than the former (X), it is judged that there is a foreign object caught in the window. According to this judging procedure, upward or downward movement of the window is started in the second period, but it is not yet moving at a constant speed. The changes in the rotation of the motor 11 are small compared with those in the first period but the rotation varies in unstable manner, and erroneous judgment based on such changes in the motor rotation is prevented. If it is judged that no foreign object is caught in the window, the time is deviated by one cycle or by a half cycle similarly to the case of the first period.

Then, in the third period, it is judged that something is caught in the window in the following case: in the case where the time duration (Y1) in which the pulses are outputted in one of the cycles similar to the first period is longer than a given multiple (e.g. twice) of the time duration (X1) in which the pulses are outputted in the first cycle, and in the case where the time duration (Y2) in which the pulses are not outputted in one of the cycles similar to the first period is longer than a given multiple (e.g. twice) of the time duration (X2) in which the pulses are not outputted in the first cycle. The judging procedure is based on the fact that the changes of the rotation of the motor 11 are smaller in the third period than those of the first or the second period because the window is moving at a constant speed in the third period.

When it is judged that nothing is caught in the window, it is deviated by one cycle or by a half cycle as in the first period, and comparison is made.

The multiplying factor used for the comparison varies according to the difference of the mechanism to move the window up or down such as wire type or gear type. Thus, the multiplying factor may be three times instead of twice.

The first cycle is compared with the second or the third cycle in each of the periods. In the case of the pulse generator 15 generating many pulses such as 2-phase pulses, the number of pulses in one rotation of the motor 11 is bigger. Accordingly, the change of pulses is small and slight. Then, it is possible to identify the change of pulses much more easily by comparing the first cycle with the third cycle.

Here, in the first period and the second period, only one cycle (X) immediately before and the next (or the next to the next) half cycle (Y1) are compared. This is because the torque value of the motor 11 is relatively low as described above in the first period and the second period, and when something is caught in the window in this period, or when the motor 11 is started while something is caught in the window, the window may be stopped after hardly moving. In such case, only 1 or 2 pulses are generated. Thus, unless judgment is made within a short period, it is not possible to detect that something is caught in the window. In this respect, it may be designed as follows: the trouble that foreign object is caught in the window is detected by comparing only one cycle (X) of the pulse immediately before with a half cycle (Y1) of the next (or the next to the next) pulse so that correct judgment is made even when the window is stopped after hardly moving.

In the third period, when judgment is made simply based on one comparison (X1 vs. Y1), detection value of Y1 may become higher due to some reason even though nothing is caught in the window, and it may be erroneously judged that something is caught in the window, and the window may be stopped or reversely operated. To prevent this erroneous operation, comparison is made by two times (X1 vs. Y1 and X2 vs. Y2). In the third period, the torque value of the motor 11 is high as shown in FIG. 2. Even when something is caught in the window during this period, the motor 11 is not immediately stopped, and 2 or 3 pulses may be generated. Therefore, it is possible to compare twice.

As described above, in the power window system of the present invention, the time period from the starting of the power window system is divided into three periods, and a judging procedure suitable for the characteristics during each of these periods is used to judge whether a foreign object is caught in the window or not. From the time point immediately after the starting to the time point when stable operation is reached, it is continuously tried to detect whether a foreign object is caught in the window or not within a short time, and erroneous detection rarely occurs in this power window system.

As already explained, the system of the present invention comprises a driving unit rotatable in normal and reverse directions to open or close car window, a pulse generator for generating repeated pulses in response to the operation of the driving unit, and a control unit for judging that something is caught in the window based on the repeated pulses and for stopping or reversely operating the driving unit. In the first period (i.e. from the starting of the driving unit to a first time point when the window starts upward movement), the control unit judges that a foreign object is caught in the window when time duration in which pulses are generated in one of the cycles in the second or the third period is longer than a given multiple of the time duration required for the first cycle immediately before the repeated pulses. In this respect, it is possible to reliably detect in a short time that there is a foreign object caught in the window in the period immediately after the starting of the motor.

According to the present invention, in the second period (i.e. from the first time point to a second time point when the window reaches and maintains operation at a constant speed) the control unit judges and detects that a foreign object is caught in the window when the time duration in which the pulses are generated in one of the second cycle and the third cycle is longer than time duration required for the first cycle. As a result, it is possible to reliably detect in a short time that a foreign object is caught in a car window during the period from the starting of upward or downward movement of the window to the time when the window reaches stable operation.

According to the present invention, in a third period after the second time point, the control unit judges and detects that a foreign object is caught in the window when time duration in which the pulses are generated in the second cycle is longer than a given multiple of time duration in which the pulses are generated in the first cycle, and also when time duration in which the pulses are not outputted in the second cycle is longer than a given multiple of the time duration when the pulses are not outputted in the first cycle. This makes it possible to continuously detect that a foreign object is caught in the window after stable operation of the window has been reached. Also, it is possible to minimize erroneous operation.

What is claimed is:

1. A power window system, comprising a driving unit rotatable in normal and reverse directions to one of open and close a car window, a pulse generator to generate repeated pulses in response to operation of the driving unit, and a control unit to judge that a foreign object is caught in the window based on the repeated pulses and to one of stop and reversely operate the driving unit, wherein:

in a first period of from a starting of the driving unit to a first time point when the window starts upward movement, the control unit judges and detects that the foreign object is caught in the window when a time duration in which pulses are generated in one of a second cycle and a third cycle is longer than a first given multiple of a time duration required for the repeated pulses in a first cycle preceding the second cycle and third cycle, and in a second period of from the first time point to a second time point when the window is operated at constant speed, the control unit judges and detects that the foreign object is caught in the window when the time duration in which pulses are generated in one of the second cycle and the third cycle is longer than a second given multiple of the time duration in the first cycle.

2. A power window system according to claim 1, wherein the first given multiple is greater than the second given multiple.

3. A power window system according to claim 2, wherein, in a third period after the second time point, the control unit judges and detects that a foreign object is caught in the window when time duration in which pulses are generated in the second cycle is longer than a given multiple of time duration in which the pulses are generated in the first cycle, and also when time duration in which pulses are not generated in the second cycle is longer than a given multiple of time duration in which pulses are not generated in the first cycle.

* * * * *